US012749697B2

(12) United States Patent
Qiu et al.

(10) Patent No.: US 12,749,697 B2
(45) Date of Patent: Sep. 29, 2026

(54) METHOD AND SYSTEM FOR DYNAMICALLY MODIFYING FUEL CELL STACK CURRENT TO MANAGE FUEL CELL MEMBRANE HYDRATION

(71) Applicant: Ford Global Technologies, LLC, Dearborn, MI (US)

(72) Inventors: Zeng Qiu, Ann Arbor, MI (US); Mostafa-Ali Ayubirad, Burlington, VT (US); Hao Wang, Ann Arbor, MI (US); Majed Ben-Kalefa, Canton, MI (US); Rajit Johri, San Francisco, CA (US); William Frederick Sanderson, Jr., Commerce Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 740 days.

(21) Appl. No.: 18/193,827

(22) Filed: Mar. 31, 2023

(65) Prior Publication Data

US 2024/0332575 A1 Oct. 3, 2024

(51) Int. Cl.

| | |
|---|---|
| ***H01M 8/04858*** | (2016.01) |
| ***H01M 8/04492*** | (2016.01) |
| ***H01M 8/04537*** | (2016.01) |
| ***H01M 8/04828*** | (2016.01) |

(52) U.S. Cl.
CPC ..... *H01M 8/0491* (2013.01); *H01M 8/04529* (2013.01); *H01M 8/04589* (2013.01); *H01M 8/0485* (2013.01); *H01M 2250/20* (2013.01)

(58) Field of Classification Search
CPC ........... H01M 8/0491; H01M 8/04529; H01M 8/04589; H01M 8/0485
See application file for complete search history.

(56) References Cited

U.S. PATENT DOCUMENTS

| | | | | |
|---|---|---|---|---|
| 6,159,626 | A | 12/2000 | Keskula et al. | |
| 7,829,236 | B2 | 11/2010 | Desouza et al. | |
| 9,083,018 | B2 | 7/2015 | Makino et al. | |
| 2008/0038594 | A1 | 2/2008 | Lai et al. | |
| 2008/0050621 | A1 | 2/2008 | Lai | |
| 2008/0311451 | A1 | 12/2008 | Araki | |
| 2010/0266917 | A1 | 10/2010 | Kelley et al. | |
| 2016/0372768 | A1 * | 12/2016 | Procter | H01M 8/04529 |
| 2019/0027766 | A1 | 1/2019 | Pence et al. | |

* cited by examiner

*Primary Examiner* — Stewart A Fraser

(74) *Attorney, Agent, or Firm* — David B. Kelley; Brooks Kushman P.C.

(57) ABSTRACT

A system includes a fuel cell stack (FCS) and a controller. The controller is configured to, in response to a stack current request corresponding to a stack current of the FCS which would cause a membrane hydration level of the FCS to be outside of a desired hydration range, adjust the stack current request to correspond to an adjusted stack current of the FCS which causes the membrane hydration level to be maintained within the desired hydration range.

13 Claims, 6 Drawing Sheets

METHOD AND SYSTEM FOR DYNAMICALLY MODIFYING FUEL CELL STACK CURRENT TO MANAGE FUEL CELL MEMBRANE HYDRATION

STATEMENT REGARDING FEDERALLY SPONSORED RESEARCH OR DEVELOPMENT

The present disclosure was made with Government support under Contract No. DE-EE0009858 awarded by the Department of Energy (DOE). The Government has certain rights to the present disclosure.

TECHNICAL FIELD

The present disclosure relates to controlling a fuel cell system in providing electrical power for vehicle propulsion.

BACKGROUND

A fuel cell is an electrochemical device that converts chemical energy of a fuel, e.g., hydrogen, and an oxidizing agent, e.g., oxygen, into electrical energy, with water as a byproduct. A fuel cell stack is a connected group of fuel cells. A fuel cell system including one or more fuel cell stacks may be used in a vehicle to provide electrical energy for vehicle propulsion.

SUMMARY

A system includes a fuel cell stack (FCS) and a controller. The controller is configured to, in response to a stack current request corresponding to a stack current of the FCS which would cause a membrane hydration level of the FCS to be outside of a desired hydration range, adjust the stack current request to correspond to an adjusted stack current of the FCS which causes the membrane hydration level to be maintained within the desired hydration range.

The controller may adjust the stack current request so that the corresponding adjusted stack current varies slower in comparison with the stack current corresponding to the stack current request.

The controller may adjust the stack current request so that the corresponding adjusted stack current varies slower by slowing an increased transient of the stack current corresponding to the stack current request. The controller may slow the increased transient of the stack current corresponding to the stack current request when the membrane hydration level is closer to a wetness level limit of the desired hydration range than to a dryness level limit of the desired hydration range.

The controller may adjust the stack current request so that the corresponding adjusted stack current varies slower by slowing a decreased transient of the stack current corresponding to the stack current request. The controller may slow the decreased transient of the stack current corresponding to the stack current request when the membrane hydration level is closer to a dryness level limit of the desired hydration range than to a wetness level limit of the desired hydration range.

The controller may adjust the stack current request so that the corresponding adjusted stack current has a different magnitude in comparison with the stack current corresponding to the stack current request.

The controller may adjust the stack current request so that the corresponding adjusted stack current has the different magnitude by decreasing the magnitude of the stack current corresponding to the stack current request. The controller may decrease the magnitude of the stack current corresponding to the stack current request when the stack current corresponding to the stack current request would cause the membrane hydration level to violate a dryness level limit of the desired hydration range.

The controller may adjust the stack current request so that the corresponding adjusted stack current has the different magnitude by increasing the magnitude of the stack current corresponding to the stack current request. The controller may increase the magnitude of the stack current corresponding to the stack current request when the stack current corresponding to the stack current request would cause the membrane hydration level to violate a wetness level limit of the desired hydration range.

The system may further include a traction battery. The controller is further configured to control the traction battery according to the adjustment of the stack current request.

A vehicle includes a traction battery, a FCS, and a controller. The controller is configured to, in response to a stack current request corresponding to a stack current of the FCS which would cause a membrane hydration level of the FCS to be outside of a desired hydration range, adjust the stack current request to correspond to an adjusted stack current of the FCS which causes the membrane hydration level to be maintained within the desired hydration range and control the traction battery according to the adjustment of the stack current request.

A method for a vehicle having a FCS includes, responsive to a stack current request corresponding to a stack current of the FCS which would cause a membrane hydration level of the FCS to be outside of a desired hydration range, adjusting the stack current request to correspond to an adjusted stack current of the FCS which causes the membrane hydration level to be maintained within the desired hydration range.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
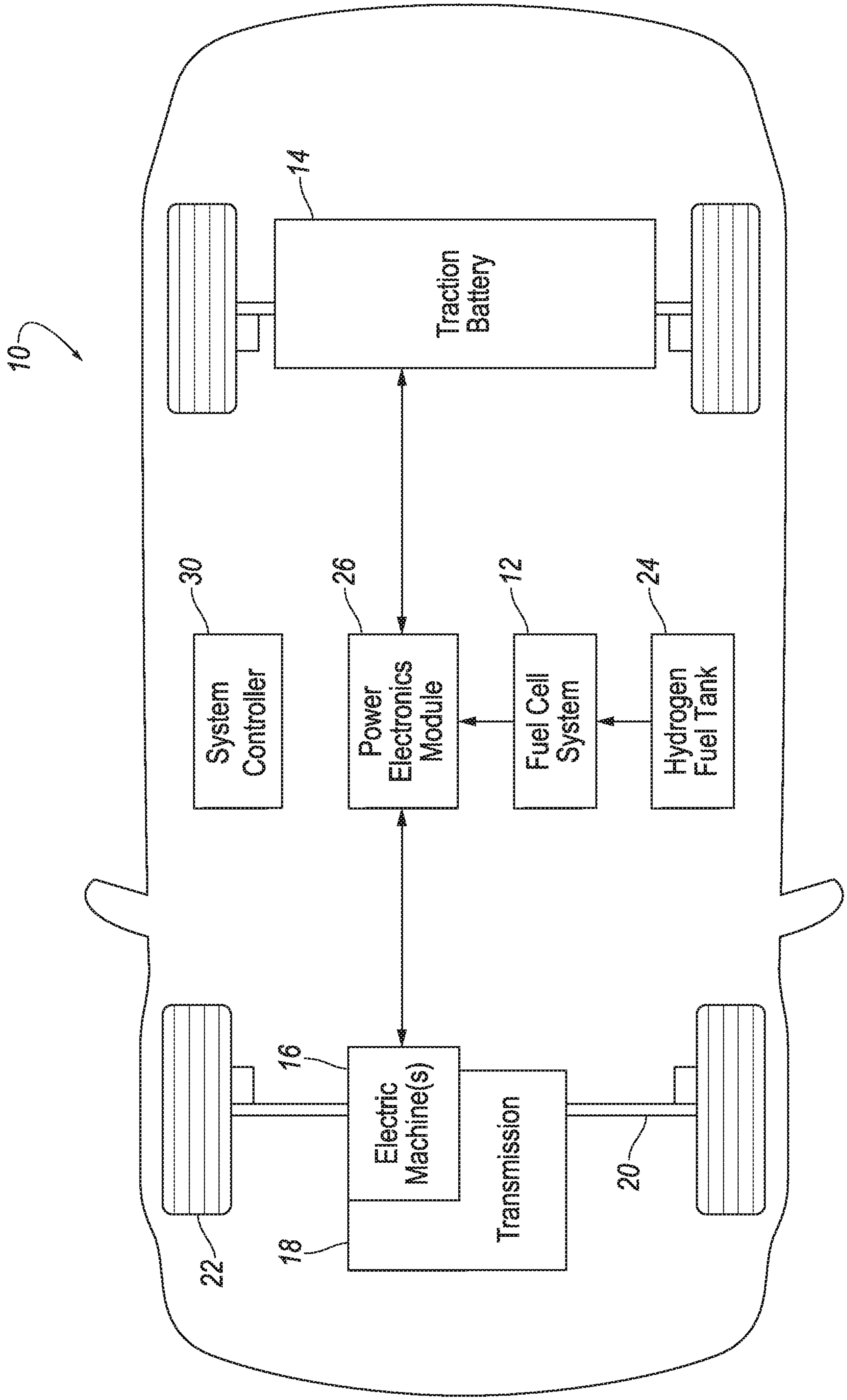
FIG. 1 illustrates a block diagram of an exemplary fuel cell electric vehicle (FCEV) having a fuel cell system (FCS) and a traction battery both for providing electrical power for vehicle propulsion, the FCS having a fuel cell stack comprised of a connected group of fuel cells.

Referring now to FIG. 1, a block diagram of an exemplary fuel cell electric vehicle (FCEV) 10 having a fuel cell system (FCS) 12 and a traction battery 14 is shown. FCS 12 and traction battery 14 are individually operable for providing electrical power for propulsion of FCEV 10.

FCEV 10 further includes one or more electric machines 16 mechanically connected to a transmission 18. Electric machine 16 is capable of operating as a motor and as a generator. Transmission 18 is mechanically connected to a drive shaft 20 mechanically connected to wheels 22 of FCEV 10. Electric machine 16 can provide propulsion and slowing capability for FCEV 10. Electric machine 16 acting as a generator can recover energy that may normally be lost as heat in a friction braking system.

FCS 12 is configured to convert hydrogen from a hydrogen fuel tank 24 of FCEV 10 into electrical power. Electrical power from FCS 12 is for use by electric machine 16 for propelling FCEV 10. FCS 12 is electrically connected to electric machine 16 via a power electronics module 26 of FCEV 10. Power electronics module 26, having an inverter or the like, provides the ability to transfer electrical power from FCS 12 to electric machine 16. For example, FCS 12 provides direct current (DC) electrical power while electric machine 16 may require three-phase alternating current (AC) electrical power to function. Power electronics module 26 converts the electrical power from FCS 12 into electrical power having a form compatible for operating electric machine 16. In this way, FCEV 10 is configured to be propelled with use of electrical power from FCS 12.

Traction battery 14 stores electrical energy for use by electric machine 16 for propelling FCEV 10. Traction battery 14 is also electrically connected to electric machine 16 via power electronics module 26. Power electronics module 26 provides the ability to bi-directionally transfer electrical power between traction battery 14 and electric machine 16. For example, traction battery 14 also provides DC electrical power while electric machine 16 may require the three-phase AC electrical power to function. Power electronics module 26 converts the electrical power from traction battery 14 into electrical power having the form compatible for operating electric machine 16. In this way, FCEV 10 is further configured to be propelled with the use of electrical power from traction battery 14.

Further, in a regenerative mode, power electronics module 26 converts AC electrical power from electric machine 16 acting as a generator to the DC electrical power form compatible with traction battery 14. Similarly, traction battery 14 may receive electrical power from FCS 12 via power electronics module 26. For instance, when FCS 12 is providing electrical power for propelling FCEV 10, any excess electrical power from the FCS not used in propelling the FCEV may be received by traction battery 14 via power electronics module 26.

FCS 12 and traction battery 14 may have one or more associated controllers to control and monitor the operation thereof. The controllers can be microprocessor-based devices. The controllers may communicate via a serial bus (e.g., Controller Area Network (CAN)) or via discrete conductors.

For example, a vehicle system controller (VSC) 30 is configured to coordinate the operation of FCS 12 and traction battery 14 in providing electrical power for propulsion of FCEV 10 and may be further configured to control the FCS and/or the traction battery accordingly. Vehicle system controller 30 ("controller") can be considered as being one controller or multiple individual controllers for controlling FCS 12 and traction battery 14.

Figure 2:
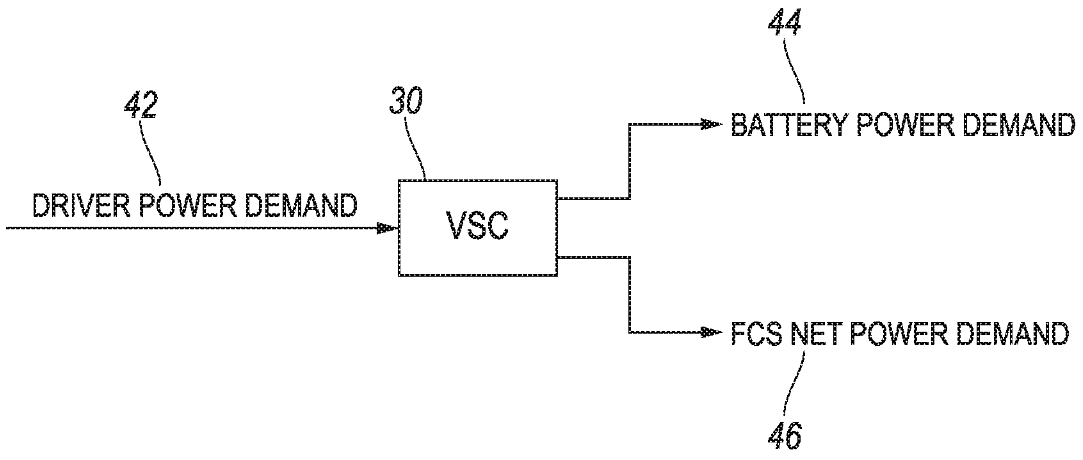
FIG. 2 illustrates a process diagram for coordinating operation of the FCS and the traction battery in providing electrical power for vehicle propulsion.

Referring now to FIG. 2, with continual reference to FIG. 1, a process diagram 40 for coordinating operation of FCS 12 and traction battery 14 in providing electrical power for propulsion of FCEV 10 is shown. In response to a driver power demand (request) 42 for propelling FCEV 10, controller 30 interprets and splits the driver power demand into a traction battery power demand (request) 44 and an FCS net power demand (request) 46, where the FCS net power is FCS gross power minus auxiliary load. In turn, controller 30 controls traction battery 14 to provide (i.e., output, deliver, etc.) electrical power commensurate with battery power request 44 for use in propelling FCEV 10. Similarly, controller 30 controls FCS 12 to provide (i.e., output, deliver, etc.) electrical power satisfying FCS net power request 46 for use in propelling FCEV 10. Controller 30 will try for the FCS power control to meet the FCS net power request. When there is any difference between the FCS power request and the actual power provided by FCS 12, controller 30 controls traction battery 14 to compensate for the difference.

FCS 12 includes one or more fuel cell stacks (not shown). Each fuel cell stack (also "FCS" where noted) is comprised of a plurality of fuel cells electrically connected in series. For simplicity, FCS 12 is described herein as having one fuel cell stack. As the fuel cells of the fuel cell stack are connected in series, (i) the electrical voltage of the fuel cell stack ("stack voltage") is a summation of the voltages of the fuel cells and (ii) each fuel cell has the same current and the current of the fuel cell stack ("stack current") is the same as the current of each of the fuel cells. Hence, the FCS gross power delivered by FCS 12 is equal to the stack voltage multiplied by the stack current, i.e., gross power=stack voltage*stack current.

In sum, in response to driver power demand 42, controller 30 demands net power from FCS 12 and controls the FCS to deliver the net power considering the auxiliary load. By drawing a stack current from the fuel cell stack, FCS 12 produces the net power, which is the gross power minus the auxiliary load.

A typical type of fuel cell is a proton-exchange membrane (PEM) fuel cell. As indicated, a PEM fuel cell (PEMFC) is an electrochemical device that transfers the chemical energy in hydrogen and oxygen to electrical energy, with water as its byproduct. A PEMFC has a membrane electrode assembly (MEA) where the chemical reaction happens. The MEA includes an anode catalyst layer, a membrane, and a cathode catalyst layer. On the anode catalyst layer, hydrogen ($H_2$) separates into hydrogen protons ($H^+$) and electrons ($e^-$), per the reaction:

$$2H_2 \rightarrow 4H^+ + 4e^-$$

When the membrane is hydrated, protons flow through to the cathode catalyst layer, where the protons, oxygen ($O_2$), and electrons combine into water, per the reaction:

$$4H^+ + 4e^- + O_2 \rightarrow 2H_2O$$

When the membrane is too dry, protons cannot move freely through the membrane thereby causing the fuel cell voltage to drop. The membrane being too dry may cause a tear/crack in the membrane, resulting in faster aging. Conversely, the membrane being too wet may cause liquid formation in the anode and cathode, which blocks the reaction and thereby also causing the fuel cell voltage to drop.

Membrane hydration is a function of many parameters including stack current, MEA temperature, cathode pressure, cathode flow, etc. However, stack current is the fastest control input to change the membrane hydration level.

Figure 3:
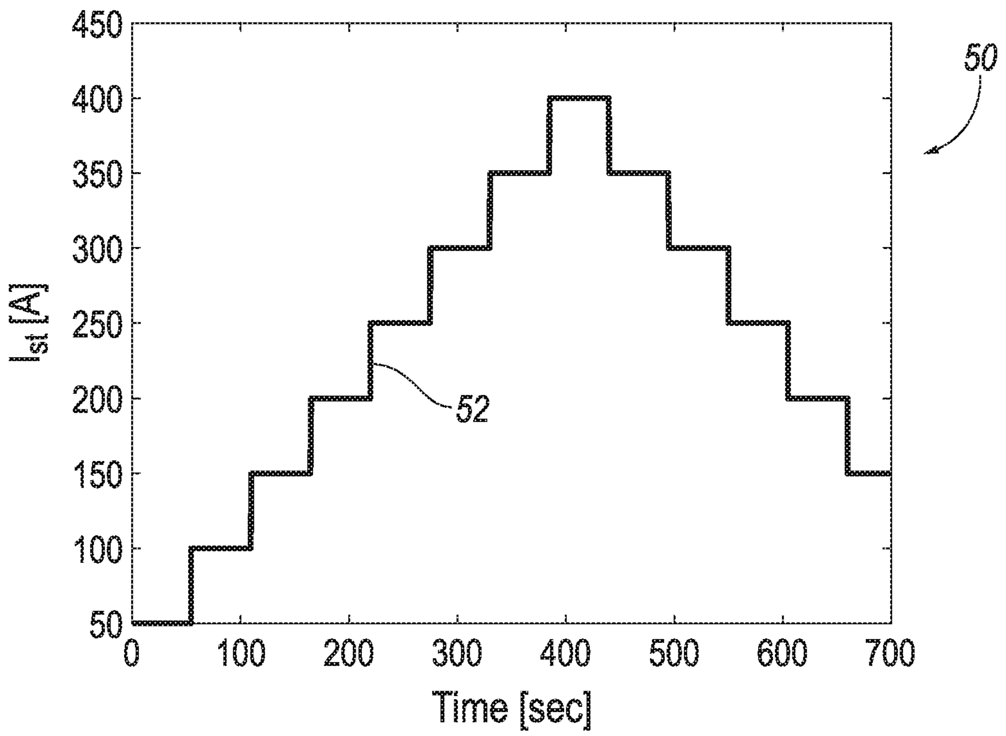
FIG. 3 illustrates a graph having a plot of a stack current of the fuel cell stack according to a step-change profile.
Figure 4:
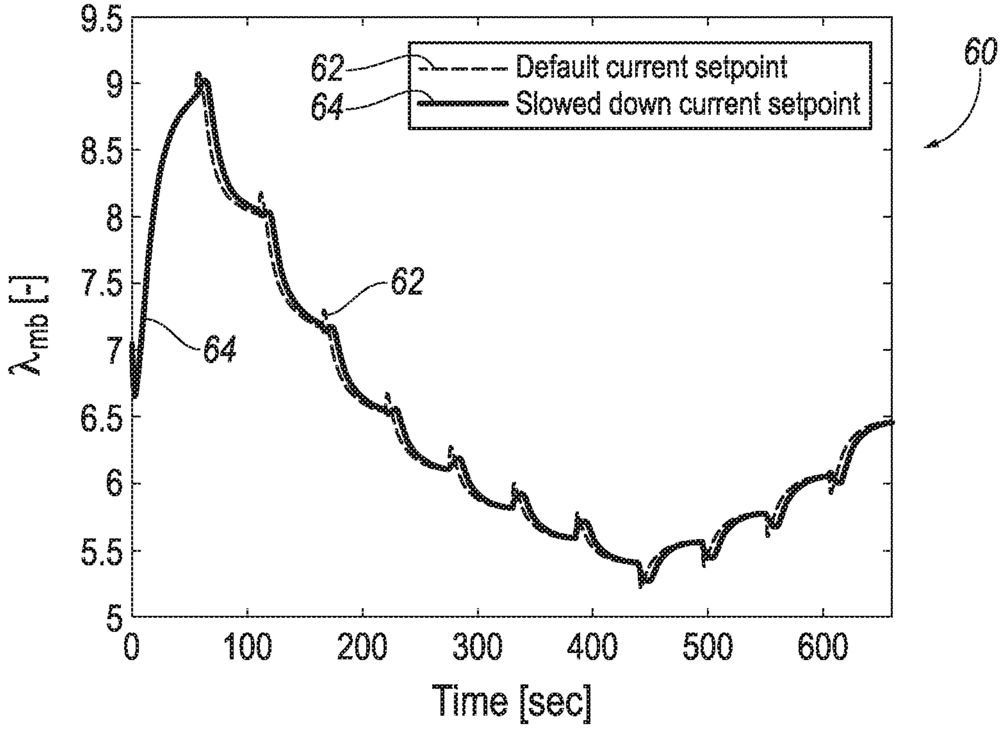
FIG. 4 illustrates a graph having a first plot of a membrane hydration level of a fuel cell of the fuel cell stack when the stack current is the step-change stack current shown in FIG. 3 and a second plot of the membrane hydration level when the stack current is a slower change version of the step-change stack current (e.g., when the stack current is a ramp-change, as opposed to a step-change, stack current)

Referring now to FIGS. 3 and 4, with continual reference to FIGS. 1 and 2, the influence of the stack current on the membrane hydration level will be discussed.

FIG. 3 illustrates a graph 50 having a plot 52 of a stack current according to a step-change profile. As an example, per the step-change profile of plot 52, the stack current increases fifty amps every fifty seconds until reaching 400 A at 400 seconds and then decreases fifty amps every fifty seconds until reaching zero amps at 800 seconds (the end point not shown as plot 52 illustrated in FIG. 3 is only up to 700 seconds).

FIG. 4 illustrates a graph 60 having (i) a first plot 62 of the membrane hydration level ($\lambda_{mb}$) when the stack current is the step-change stack current shown in plot 52 of FIG. 3 and (ii) a second plot 64 of the membrane hydration level ($\lambda_{mb}$) when the stack current is a slower change version of the step-change stack current. For instance, a slower change version of the step-change stack current is the step-change stack current modified to have a ramp-change instead of the step-change. As set forth, graph 60 is indicative of membrane hydration level changes with fast and slow current changes simulated on a high-fidelity fuel cell stack model.

During a power up-transient of the fuel cell stack, when the stack current increases quickly, the amount of water produced on the cathode catalyst layer increases, causing the membrane water content to rise quickly during the initial transient. When the water content of the membrane is already high, a quick rise in the stack current can cause the membrane to flood. This phenomenon can be observed from graph 60 of FIG. 4. First plot 62 is the membrane hydration level (simulated from a high-fidelity model) when the stack current is the step-change stack current shown in plot 52 of FIG. 3. When the stack current increases quickly, the membrane hydration level has a blip that rises quickly, then drops gradually.

Similarly, for a power down-transient of the fuel cell stack, when the stack current decreases quickly, the amount of water produced on the cathode layer decreases, causing the membrane water content to drop quickly during the initial transient. When the water content of the membrane is already low, a quick drop in the stack current can cause the membrane to dry out further quickly. This phenomenon can also be observed from graph 60 of FIG. 4 in which first plot 62 is the membrane hydration level when the stack current is the step-change stack current shown in plot 52 of FIG. 3. When the stack current decreases quickly, the membrane hydration level has a blip that drops quickly, then rises gradually.

Second plot 64 of graph 60 of FIG. 4 is the membrane hydration level when the stack current is a slower change version of the step-change stack current shown in plot 52 of FIG. 3. For example, the slower change version of the step-change stack current is a ramp-change stack current having a ±1 A/sec ramp rate. As such, instead of step changing fifty amps at fifty second intervals per plot 52 of FIG. 3, the ramp-change stack current changes one amp at one second intervals. It can be observed from second plot 64 that the above-noted blip is either removed or reduced with the slower current draw.

Also observed from graphs 50 and 60, when the steady-state stack current is higher, the steady-state membrane hydration level is lower and when the steady-state stack current is lower, the steady-state membrane hydration level is higher. Depending on the operating conditions such as stack temperature, relatively high constant current draw can potentially cause the membrane to dry-out and relatively low constant current draw can potentially cause the membrane to flood.

Controller 30, in accordance with embodiments of the present disclosure, controls FCS 12 and traction battery 14 in providing electrical power to propel FCEV 10 in a manner in which the membrane hydration is managed so as to evade membrane flood and dry-out. Particularly, controller 30 dynamically modifies the stack current to manage membrane hydration. That is, controller 30 handles membrane hydration constraints (i.e., not too wet, and not too dry) through stack current to evade membrane flood/dry-out.

Controller 30 is operable to estimate fuel cell membrane hydration. In this regard, the membrane hydration level cannot be measured directly, but can be inferred from measurements such as high frequency resistance, electrochemical impedance spectroscopy, cell voltage, and other system sensor measurements. One of ordinary skill in the art understands that controller 30 can be configured appropriately to be able to estimate membrane hydration accurately.

In operation, controller 30 dynamically modifies the stack current (i.e., the fuel cell current draw) to handle the membrane hydration constraints, which dynamic modifications include:

(a) slowing down an increased stack current transient (i.e., a stack current up-transient) when the membrane is too wet in order to evade the stack current transient from otherwise potentially causing membrane flooding;

(b) slowing down a decreased stack current transient (i.e., a stack current down-transient) when the membrane is too dry in order to evade the stack current transient from otherwise potentially causing membrane dry-out;

(c) decreasing the stack current draw (i.e., lower a magnitude or a level of the stack current) when a relatively high stack current that can cause membrane dry-out is requested in order to evade the stack current draw from otherwise potentially causing membrane dry-out; and (d) increasing the stack current draw (i.e., raise the magnitude or the level of the stack current) when a relatively low stack current that can cause membrane flood is requested in order to evade the stack current draw from otherwise potentially causing membrane flooding.

The stack current being modified by controller 30 to enforce the membrane hydration constraints causes the net power provided by FCS 12 to be different than a requested FCS net power. Accordingly, in conjunction with modifying the stack current, controller 30 controls traction battery 14 to compensate for the power difference.

Figure 5:
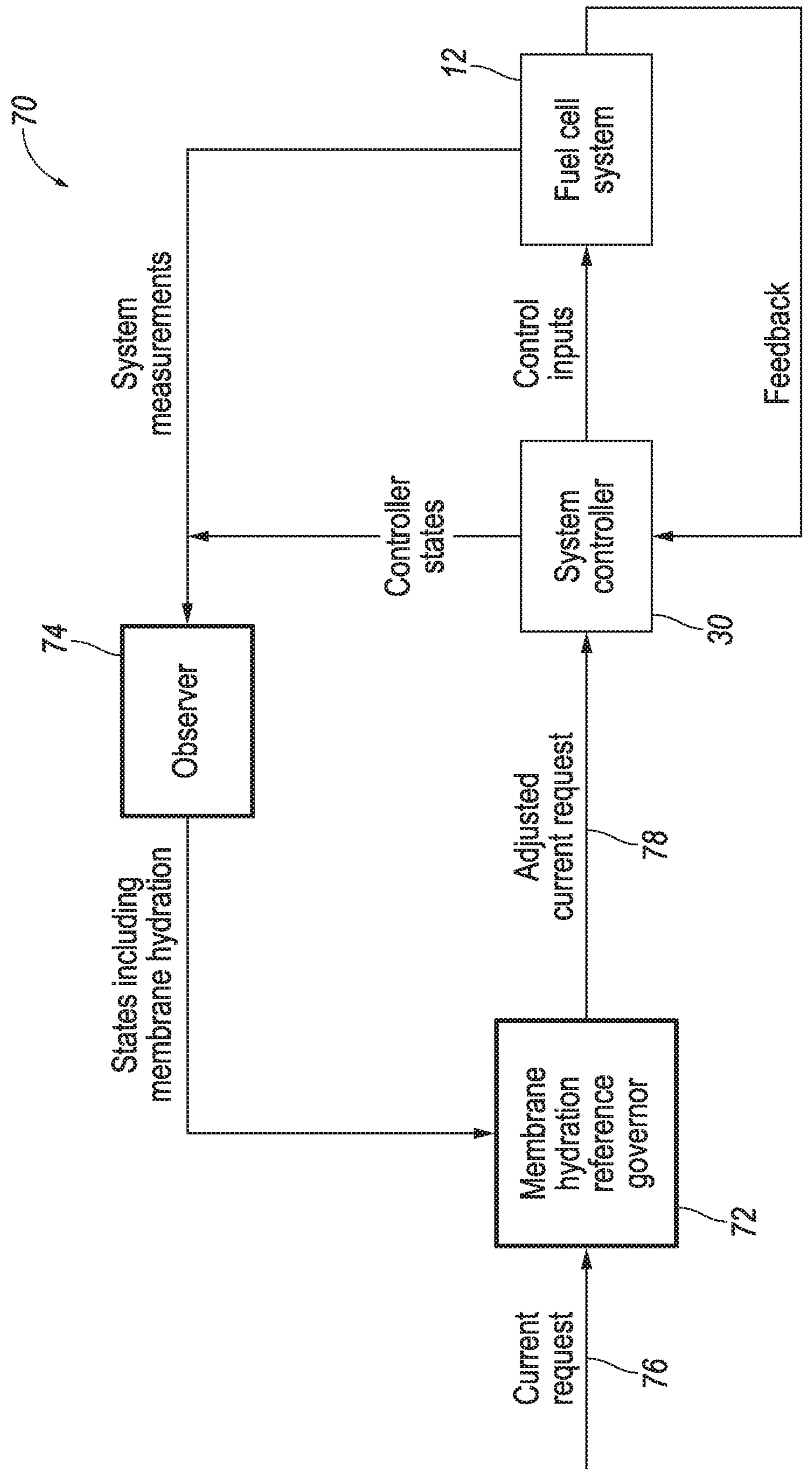
FIG. 5 illustrates a block diagram of a feedback control algorithm having a fuel cell membrane hydration reference generator for dynamically modifying the stack current in controlling the FCS in order to manage fuel cell membrane hydration.

Referring now to FIG. 5, with continual reference to FIGS. 1 and 2, a block diagram 70 of feedback control algorithm having a membrane hydration reference governor 72 for dynamically modifying the stack current in controlling FCS 12 in order to manage membrane hydration is shown. Controller 30 is configured to implement the feedback control algorithm utilizing reference governor 72 to perform the stack current modification actions to enforce the membrane hydration constraints, per the equation:

$$\lambda_{min} \le \lambda_{mb} \le \lambda_{max} \quad (1)$$

where $\lambda_{mb}$ is the membrane hydration level as noted above, $\lambda_{min}$ is the membrane dry-out limit, and $\lambda_{max}$ is the membrane flood limit.

Membrane hydration reference governor 72 is shown in block diagram 70 as being a separate component but is included with controller 30. Further, in implementing the feedback control algorithm, controller 30 further includes an observer 74, also shown in block diagram 70.

A reference governor (RG) is a predictive constraint management technique that modifies a reference signal to a closed-loop control system to maintain system constraints. As shown in block diagram 70, membrane hydration RG 72 is applied to the stack current reference 76 to manage membrane hydration constraints. The modified stack current request 78 is an input to the original closed-loop system controller 30. Observer 74 is used to estimate the system states. Membrane hydration RG 72 uses the measurements or estimates of the closed-loop system states at each timestep and modifies the stack current reference 76 as little as possible to maintain membrane hydration constraints.

Membrane hydration RG 72 employing a linear prediction model is computationally efficient. With a linear model, standard estimation techniques such as Luenberger observer or Kalman filter can be applied.

In further detail, implementation of the feedback control algorithm involves initially linearizing the closed-loop system (i.e., original closed-loop system controller 30 and FCS 12) around an equilibrium point into the form $\dot{x}=Ax+Bv$, $y=Cx+Dv$, where x is the system states, y is the system output (which is the membrane hydration level), v is the system input (which is the stack current), and A, B, C, D are matrixes that describes the dynamics of the linear system. With the system model, to predict and prevent membrane hydration constraint violations, a maximal admissible set (MAS) is generated by controller 30. The maximal admissible set is a set of all system states x and constant inputs v such that the membrane hydration constraints are satisfied, per the equation:

$$O_\infty = \{(x, v): x[0] = x,\ v[k] = v,\ y[k] \in Y,\ \forall k \in Z^+\} \quad (2)$$

where $y[k]=CA^k x[0]+(C(I-A^k)(I-A)^{-1}B+D)v$, and $Y=[\delta\lambda_{min}, \delta\lambda_{max}]$ is the membrane hydration level constraint (equation 1 above) adjusted by the linearization equilibrium point.

An inner approximation of $O_\infty$ can be obtained offline per the equation (3):

$$\tilde{O}_\infty = \{(x, v): H_0 v \in (1-\epsilon)Y,\ H_0 v + CA^k(x - x_{ss}(v)) \in Y,\ \forall k = 0, 1, \ldots, k^*\}$$

where $x_{ss}(v)=(I-A)^{-1}Bv$, $H_0=C(I-A)^{-1}B+D$, and $0<\epsilon<1$. The inner approximation $\tilde{O}_\infty$ is finitely determined which makes the online optimization of membrane hydration reference governor 72 feasible. Membrane hydration reference governor 72 enforces the constraints by using the update law, per the equation:

$$v[k] = v[k-1] + \kappa[k](r(k) - v(k-1)) \quad (4)$$

where $\kappa \in [0,1]$. If $\kappa=0$, then the reference v is kept constant compared to the last step time. If $\kappa=1$, then the reference v is not modified compared to the original reference r.

Controller 30 performs an online linear programming ($\text{maximize}_{\kappa \in [0,1]} \kappa$) such that:

$$v[k] = v[k-1] + \kappa[k](r(k) - v(k-1)) \quad (5)$$

and $$(x[k], v[k]) \in \tilde{O}_\infty$$

Figure 6:
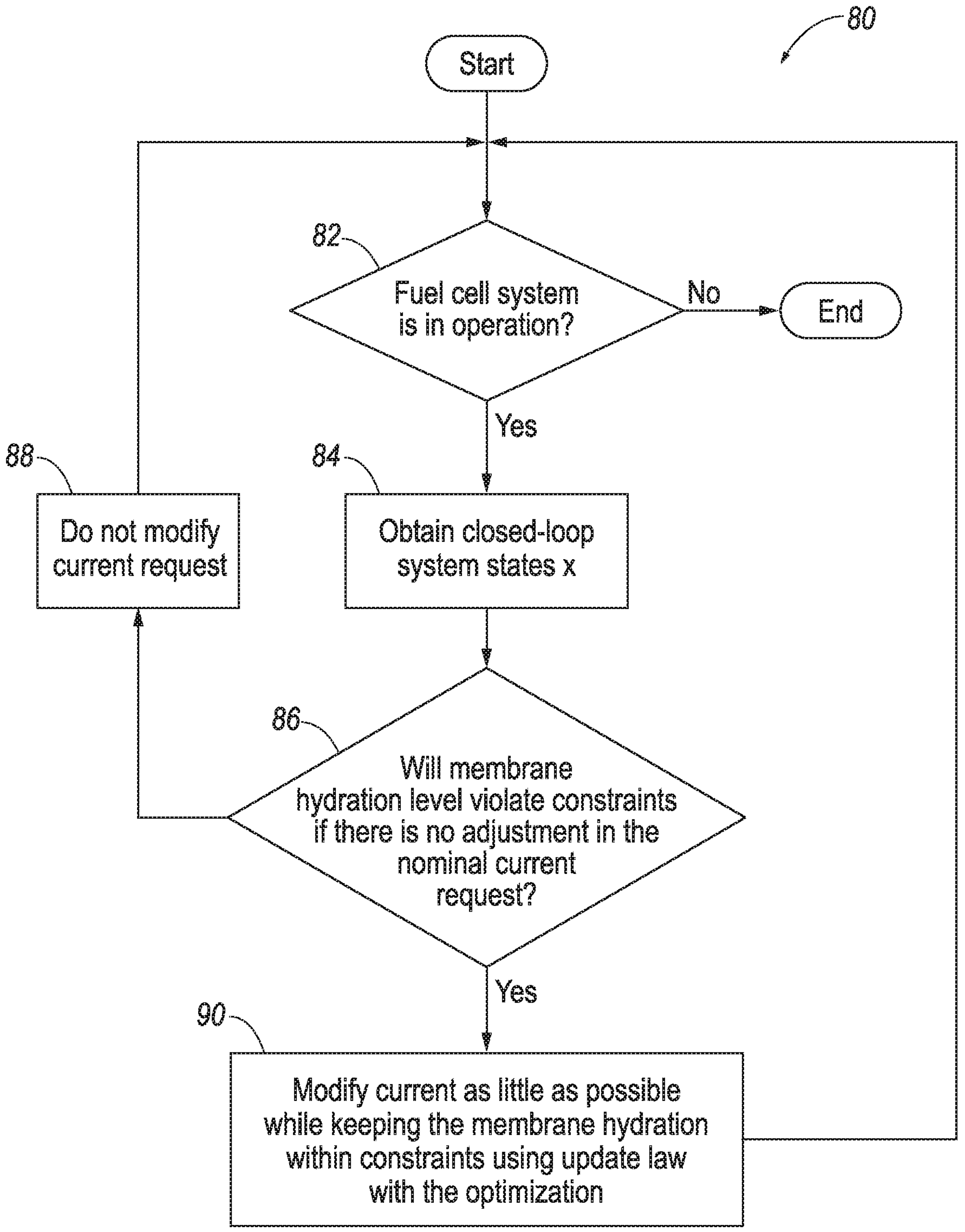
FIG. 6 illustrates a flowchart depicting operation involving the feedback control algorithm.

Referring now to FIG. 6, with continual reference to FIGS. 1, 2, and 5, a flowchart 80 depicting operation involving the feedback control algorithm. As such, flowchart 80 depicts operation concerning the fuel cell hydration managing reference governor algorithm.

The operation is applicable while FCS 12 is operating, as indicated by decision block 82. FCS 12 operating means that the FCS is providing electrical energy for propulsion of FCEV 10 (and/or providing electrical energy for charging traction battery 14). Assuming FCS 12 is operating, the operation further includes controller 30 obtaining the closed-loop system states x, as indicated by process block 84. In view of a stack current request, controller 30 determines whether dynamic modification of the stack current is desired in order to manage the membrane hydration level, as indicated by decision block 86. That is, controller 30 determines whether the stack current is to be modified in order to maintain the membrane hydration within the constraints and thereby prevent the membrane from flooding or drying out.

On the one hand, if modification of the stack current is not desired (meaning that the stack current will not cause the membrane from flooding or drying out), then controller 30 does not modify the stack current request and hence does not modify the stack current, as shown by process block 88.

On the other hand, if modification of the stack current is desired (meaning that the stack current may cause the membrane to flood or dry out if left unchanged), then controller 30 does modify the stack current request and hence does modify the stack current, as shown by process block 90. When modifying the stack current, controller 30 may modify the stack current as little as possible while keeping the membrane hydration within constraints. In this regard, controller 30 uses the update law of equation (4) with the optimization of equation (5).

Figure 7A:
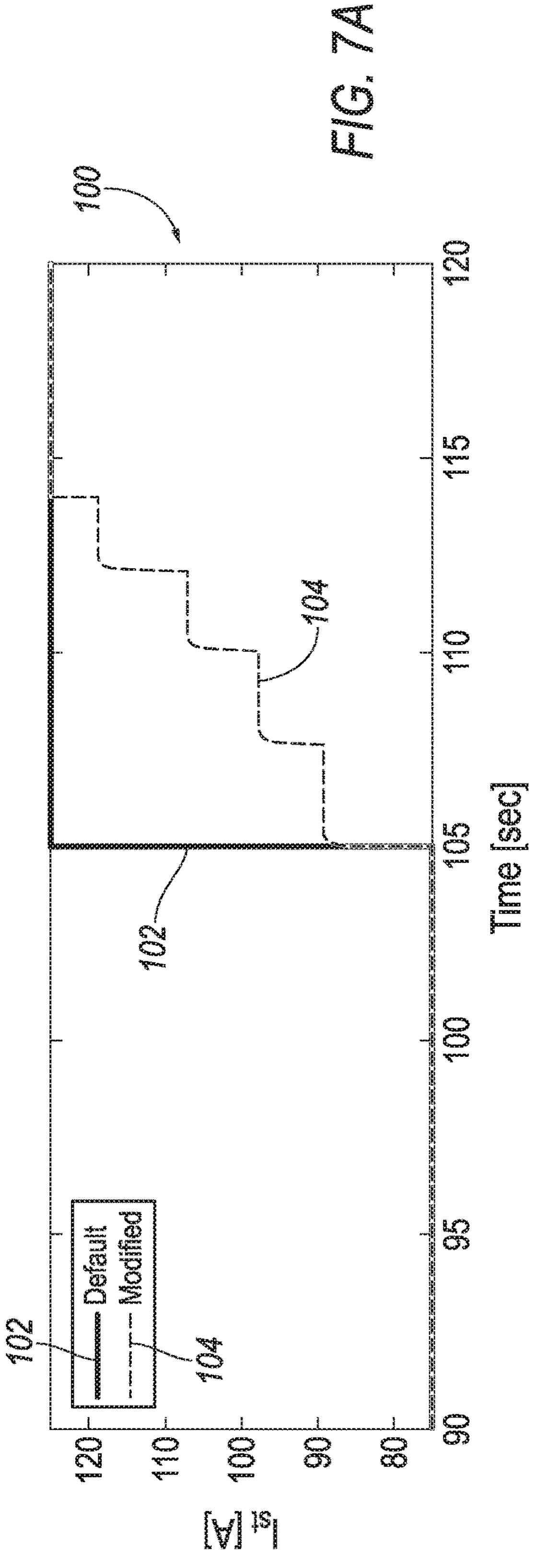
FIG. 7A illustrates a graph having a first plot of an immediate step-change stack current and a second plot of a gradual step-change stack current.
Figure 7B:
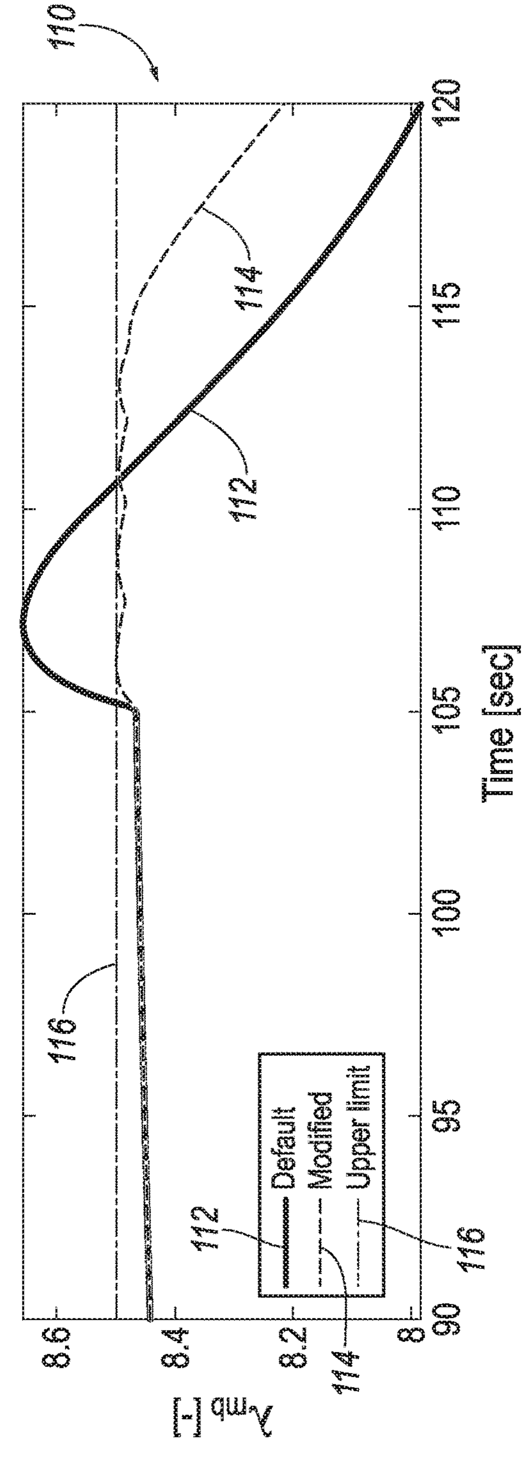
FIG. 7B illustrates a graph having a first plot of the fuel cell membrane hydration level when the stack current is the immediate step-change stack current and a second plot of the fuel cell membrane hydration level when the stack current is the gradual step-change stack current.

Referring now to FIGS. 7A and 7B, a simulation result of the fuel cell hydration managing reference governor algorithm will be described. FIGS. 7A and 7B concern the above-noted membrane hydration constraint action “a”

(namely, slowing down an increased stack current transient when the membrane is too wet in order to evade the stack current transient from otherwise potentially causing membrane flooding).

In this regard, FIG. 7A illustrates a graph 100 having (i) a first plot 102 of an immediate step-change stack current and (ii) a second plot 104 of a gradual step-change stack current. As can be understood from graph 100, the gradual step-change stack current is a modified version of the immediate step-change stack current. The modification entails making the stack current increase step-wise relatively gradually from an initial amperage level (75 A in graph 100) at a starting time (105 seconds in graph 100) to an increased amperage level (125 A in graph 100) at a final time (115 seconds in graph 100) per plot 104, as opposed to the unmodified stack current increasing step-wise immediately from the initial amperage level to the increased amperage level at a time instant (105 seconds in graph 100) per plot 102.

FIG. 7B illustrates a graph 110 having (i) a first plot 112 of the membrane hydration level when the stack current is the immediate step-change stack current per plot 102 of graph 100 and (ii) a second plot 114 of the membrane hydration level when the stack current is the gradual step-change stack current per plot 104 of graph 100.

Graph 110 further includes a third plot 116 of the membrane hydration level constraint. As indicated by plot 116, the membrane hydration level constraint used for this demonstration is $\lambda_{mb}<8.5$. That is, the membrane hydration level is $\Delta_{mb}<8.5$ is to be maintained as otherwise the membrane may flood.

Stack current plot 102 and membrane hydration level plot 112 pertain to the conventional arrangement in which the membrane hydration reference governor is not used. In this demonstration, at the time (105 seconds) when the stack current immediately increases from the initial amperage level to the increased amperage level, the membrane hydration level rises above the membrane hydration level constraint indicated by plot 116 before subsequently dropping (at 110 seconds) back below the membrane hydration level constraint. Accordingly, the conventional arrangement without use of the membrane hydration reference governor violates the membrane hydration level constraint.

Stack current plot 104 and membrane hydration level plot 114 pertain to the arrangement pursuant to the present disclosure in which the membrane hydration reference governor is used. In this demonstration, use of the membrane hydration reference governor modifies the stack current to be slowed down. Particularly, the stack current is modified to gradually increase from the initial amperage level to the increased amperage level over a period of time (115 seconds−105 seconds=10 seconds) as opposed to at a shortened time instant. In this demonstration, the membrane hydration level never rises above the membrane hydration level constraint (i.e., the membrane hydration level is kept below the membrane hydration level constraint indicated by plot 116 the entire time). Accordingly, the arrangement pursuant to the present disclosure with use of the membrane hydration reference governor does not violate the membrane hydration level constraint.

As described, embodiments of the present disclosure provide logic to dynamically modify the stack current (or the fuel cell current) to manage fuel cell membrane hydration constraints.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A system comprising:

a fuel cell stack (FCS); and a controller configured to, in response to a stack current request corresponding to a stack current of the FCS which would cause a membrane hydration level of the FCS to be outside of a desired hydration range, adjust the stack current request to correspond to an adjusted stack current of the FCS which causes the membrane hydration level to be maintained within the desired hydration range; and wherein the controller adjusts the stack current request so that the corresponding adjusted stack current varies slower in comparison with the stack current corresponding to the stack current request.

2. The system of claim 1 wherein:

the controller adjusts the stack current request so that the corresponding adjusted stack current varies slower by slowing an increased transient of the stack current corresponding to the stack current request.

3. The system of claim 2 wherein:

the desired hydration range has a wetness level limit and a dryness level limit; and the controller slows the increased transient of the stack current corresponding to the stack current request when the membrane hydration level is closer to the wetness level limit than to the dryness level limit.

4. The system of claim 3 wherein:

the controller adjusts the stack current request so that the corresponding adjusted stack current varies slower by slowing a decreased transient of the stack current corresponding to the stack current request.

5. The system of claim 4 wherein:

the controller slows the decreased transient of the stack current corresponding to the stack current request when the membrane hydration level is closer to the dryness level limit than to the wetness level limit.

6. The system of claim 1 further comprising:

a traction battery; and wherein the controller is further configured to control the traction battery according to the adjustment of the stack current request.

7. A system comprising:

a fuel cell stack (FCS); and a controller configured to, in response to a stack current request corresponding to a stack current of the FCS which would cause a membrane hydration level of the FCS to be outside of a desired hydration range, adjust the stack current request to correspond to an adjusted stack current of the FCS which causes the membrane hydration level to be maintained within the desired hydration range; and wherein the controller adjusts the stack current request so that the corresponding adjusted stack current has a different magnitude in comparison with the stack current corresponding to the stack current request.

8. The system of claim 7 wherein:

the controller adjusts the stack current request so that the corresponding adjusted stack current has the different magnitude by decreasing the magnitude of the stack current corresponding to the stack current request.

9. The system of claim 8 wherein:

the desired hydration range has a wetness level limit and a dryness level limit; and the controller decreases the magnitude of the stack current corresponding to the stack current request when the stack current corresponding to the stack current request would cause the membrane hydration level to violate the dryness level limit.

10. The system of claim 7 wherein:

the controller adjusts the stack current request so that the corresponding adjusted stack current has the different magnitude by increasing the magnitude of the stack current corresponding to the stack current request.

11. The system of claim 10 wherein:

the desired hydration range has a wetness level limit and a dryness level limit; and the controller increases the magnitude of the stack current corresponding to the stack current request when the stack current corresponding to the stack current request would cause the membrane hydration level to violate the wetness level limit.

12. A vehicle comprising:

a traction battery;

a fuel cell stack (FCS); and a controller configured to, in response to a stack current request corresponding to a stack current of the FCS which would cause a membrane hydration level of the FCS to be outside of a desired hydration range, adjust the stack current request to correspond to an adjusted stack current of the FCS which causes the membrane hydration level to be maintained within the desired hydration range and control the traction battery according to the adjustment of the stack current request; and wherein the controller adjusts the stack current request so that the corresponding adjusted stack current varies slower in comparison with the stack current corresponding to the stack current request.

13. The vehicle of claim 12 wherein:

the controller adjusts the stack current request so that the corresponding adjusted stack current varies slower by slowing a transient of the stack current corresponding to the stack current request.

* * * * *